United States Patent [19]

Ohkawa et al.

[11] Patent Number: 5,525,645
[45] Date of Patent: *Jun. 11, 1996

[54] RESIN COMPOSITION FOR OPTICAL MOLDING

[75] Inventors: Kazuo Ohkawa; Seiichi Saito, both of Tokyo, Japan

[73] Assignee: Asahi Denka Kogyo K.K., Tokyo, Japan

[*] Notice: The term of this patent shall not extend beyond the expiration date of Pat. No. 5,434,196.

[21] Appl. No.: 417,758

[22] Filed: Apr. 6, 1995

Related U.S. Application Data

[63] Continuation of Ser. No. 270,058, Jul. 1, 1994, Pat. No. 5,434,196, which is a continuation of Ser. No. 871,588, Apr. 20, 1992, abandoned, which is a continuation of Ser. No. 425,178, filed as PCT/89/00155, Feb. 16, 1989, abandoned.

Foreign Application Priority Data

| | | | |
|---|---|---|---|
| Feb. 19, 1988 | [JP] | Japan | 63-37034 |
| Jul. 15, 1988 | [JP] | Japan | 63-176337 |
| Sep. 19, 1988 | [JP] | Japan | 63-234496 |
| Sep. 19, 1988 | [JP] | Japan | 234497 |

[51] Int. Cl.$^6$ .................................................. C08F 2/46
[52] U.S. Cl. ........................... 522/74; 522/15; 522/31; 522/100; 522/170
[58] Field of Search ........................... 522/15, 31, 100, 522/170, 74

[56] References Cited

U.S. PATENT DOCUMENTS

| | | | |
|---|---|---|---|
| 4,828,873 | 5/1989 | Vara et al. | 427/44 |
| 4,885,319 | 12/1989 | Dougherty et al. | 522/170 |
| 4,908,227 | 3/1990 | Dougherty et al. | 427/44 |
| 5,434,196 | 7/1995 | Ohkawa et al. | 522/100 |

OTHER PUBLICATIONS

Chemical Abstracts 109(24):212428q, Dougherty et al. "Vinyl ethers for Cationic UV Curing", 1986.

*Primary Examiner*—Mark Chapman
*Attorney, Agent, or Firm*—Flynn, Thiel, Boutell & Tanis

[57] ABSTRACT

The present invention relates to a resin composition for optical molding which comprises (a) an actinic radical-curable and cationically polymerizable organic substance and (b) an actinic radiation-sensitive initiator for cationic polymerization. This composition can be cured without being affected by atmospheric oxygen.

4 Claims, No Drawings

RESIN COMPOSITION FOR OPTICAL MOLDING

This is a continuation of Ser. No. 08/270,058, filed Jul. 1, 1994, now U. S. Pat. No. 5,434,196, which is a continuation of Ser. No. 08/871,588, filed Apr. 20, 1992, now abandoned, which is a continuation of Ser. No. 07/425,178, filed as PCT/JP89/00155, Feb. 16, 1989, now abandoned.

[BACKGROUND OF THE INVENTION]

The present invention relates to an actinic radiation-curable resin composition for optical molding. More particularly, it relates to an actinic radiation-curable resin composition for optical molding which comprises (a) an actinic radiation-curable and cationically polymerizable organic substance and (b) an actinic radiation-sensitive initiator for cationic polymerization as essential components.

[PRIOR ART]

Generally, a model for the preparation of a casting mold which has a shape corresponding to that of an objective article, a profiling control model for cutting or a model for electrical discharge diesinking electrode has been prepared by hand or by NC cutting with a numerically controlled milling machine. However, manual cutting has a problem of necessitating more labor and skill, while NC cutting has problems that a complicated working program must be prepared with regard to the exchange of a cutter blade in compliance with a desired edge shape and the abrasion of the edge and that further finishing must be made in some cases to remove the corrugations generated on the work surface. Recently, it has been expected to develop a new optical molding technique which is free from these problems and can give a complicated model for the preparation of a casting mold, profiling or electrical discharge diesinking or other various molded articles.

A resin for optical molding must satisfy such various requirements as high sensitivity to the curing with an actinic radiation, excellent resolution of curing with an actinic radiation, high ultraviolet transmittance after curing, low viscosity, large γ-characteristics reduced volume shrinkage caused by curing, production of a cured product excellent in mechanical strengths, excellent self-adhesion, and excellent curing characteristics in an oxygen atmosphere.

Up to this time, radical-polymerizable resin compositions have been known as compositions for optical molding and examples thereof include photosensitive resins mainly comprising polyester acrylate, urethane acrylate, epoxy acrylate or polyether acrylate. However, these resins have problems that the polymerization thereof hindered by atmospheric oxygen, because the polymerization thereof is of radical type, that the cure shrinkage is large, that the sensitivity to radiation energy is low and that they are irritant to the skin, particularly when the viscosity thereof is low. Thus, they are poor in practicality as a resin for optical molding.

Meanwhile, Japanese Patent Laid-Open No. 235318:/1987discloses a process for photo-curing an epoxy compound having at least two epoxy groups in its molecule and a vinyl compound having at least two vinyl groups in its molecule simultaneously in the presence of a triarylsulfonium salt catalyst. Since, however, this process is not one aiming at obtaining a resin for optical molding, the resin obtained by the process is not optimum for optical molding, even if used therefor.

[DISCLOSURE OF THE INVENTION]

The present invention has been accomplished as a result of intensive studies on photosensitive resins having various characteristics required as a resin for optical molding.

An object of the present invention is to provide a resin composition suitable for optical molding with an actinic radiation.

The resin composition for optical molding according to the present invention comprises (a) an actinic radiation-curable and cationically polymerizable organic substance and (b) an actinic radiation-sensitive initiator for cationic polymerization as essential components. The resin composition for optical molding according to the present invention is an actinic radiation-curing resin composition of cationic polymerization type, so that the curing of the composition with an actinic radiation is not affected by atmospheric oxygen at all and is highly sensitive. Further, the volume shrinkage of the composition upon curing can be reduced to give a molded article excellent in dimensional accuracy. Furthermore, according to the present invention, a low-viscosity resin composition can be easily prepared to shorten the molding time.

The resin composition according to the present invention may further contain (c) an actinic radiation-curable and radical-polymerizable organic substance and (d) an actinic radiation-sensitive initiator for radical polymerization.

Further, the resin composition according to the present invention may contain (c) an actinic radiation-curable and radical-polymerizable organic substance, (d) an actinic radiation-sensitive initiator for radical polymerization and (e) a filler.

Preferably, the resin composition according to the present invention comprises (a) an actinic radiation-curable and cationically polymerizable organic substance comprising at least 40% by weight of an alicyclic epoxy resin having at least two epoxy groups in its molecule and at least 30% by weight of a vinyl ether resin having at least two vinyl groups in its molecule, (b) an actinic radiation-sensitive initiator for cationic polymerization, (c) an actinic radiation-curable and radical-polymerizable organic substance and (d) an actinic radiation-sensitive initiator for radical polymerization.

Component (a)

The actinic radiation-curable and cationically polymerizable organic substance (a) which is one of the components constituting the resin composition according to the present invention is a cationically polymerizable compound which is polymerizable or crosslinkable by irradiation with an actinic radiation in the presence of an actinic radiation-sensitive initiator for cationic polymerization and may be one or more members selected from among epoxy, cyclic ether, cyclic lactone, cyclic acetal, cyclic thio ether, spiro ortho ester and vinyl compounds. Among these cationically polymerizable compounds, those having at least one epoxy group per molecule are preferable and examples thereof include conventional aromatic, alicyclic and aliphatic epoxy resins. The aromatic epoxy resin is preferably polyglycidyl ether of a polyhydric phenol having at least one aromatic nucleus or an adduct thereof with alkylene oxide and examples thereof include glycidyl ethers prepared by the reaction of epichlorohydrin with bisphenol A or an adduct thereof with alkylene oxide and epoxy-novolac resins. Preferable examples of the alicyclic epoxy resin include polyglycidyl ethers of polyhydric alcohols having at least one alicyclic ring and cyclohexene oxide or cyclopentene oxide compounds prepared by epoxidizing cyclohexene or cyclopentene compounds with a suitable oxidizing agent such as hydrogen peroxide or per acid. Representative particular examples of the alicyclic epoxy resin include hydrogenated bisphenol A diglycidyl ether, 3,4-epoxycyclohexylmethyl 3,4-epoxycyclohexanecarboxylate, 2-(3,4-epoxycyclohexyl-5,5-spiro-3,4-epoxy-)cyclo-hexane-m-dioxane, bis(3,4-epoxycyclohexylmethyl) adipate, vinylcyclohexene dioxide, 4-vinylepoxycyclohexane, bis(3,4-epoxy-6-methyl-cyclohexylmethyl) adipate, 3,4-epoxy-6-methylcyclohexyl, 3,4-epoxy-6-methylcyclohexanecarboxylate, methylenebis ( 3,4-epoxycyclohexane), dicyclopentadiene diepoxide, di(3,4-epoxycyclohexylmethyl)ether of ethylene glycol, ethylenebis-(3,4-epoxycyclohexanecarboxylate), dioctyl epoxyhexahydrophthalate and di-2-ethylhexyl epoxyhexahydrophthalate.

Preferable examples of the aliphatic epoxy resin include polyglycidyl ethers of aliphatic polyhydric alcohols or adducts thereof with alkylene oxide; polyglycidyl esters of long-chain aliphatic polybasic acids and homopolymers and copolymers of glycidyl acrylate or glycidyl methacrylate. Representative particular examples thereof include 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether, polyglycidyl ether of polyether polyol prepared by the addition of aliphatic polyhydric alcohols such as ethylene glycol, propylene glycol or glycerin with one or more alkylene oxides and diglycidyl esters of long-chain aliphatic dibasic acids. Further, other examples thereof include monoglycidyl ethers of aliphatic higher alcohols; monoglycidyl ethers of phenol, cresol, butylphenol or polyether alcohols prepared by the addition thereof with alkylene oxide; glycidyl esters of higher fatty acids; epoxidized soybean oil; butyl epoxystearate; octyl epoxystearate; epoxidized linseed oil and epoxidized polybutadiene.

Examples of the cationically polymerizable organic substance other than epoxy compounds include oxetane compounds such as trimethylene oxide, 3,3-dimethyloxetane and 3,3-dichloromethyloxethane; oxolane compounds such as tetrahydrofuran and 2,3-dimethyltetrahydrofuran; cyclic acetal compounds such as trioxane, 1,3-dioxolane and 1,3, 6-trioxacyclooctane; cyclic lactone compounds such as B-propiolactone and ε-caprolactone; thiirane compounds such as ethylene sulfide, 1,2-propylene sulfide and thioepichlorohydrin; thietane compounds such as 1,3-propylene sulfide and 3,3-dimethylthietane; vinyl ether compounds such as ethylene glycol divinyl ether, polyalkylene glycol divinyl ether, alkyl vinyl ether and 3,4-dihydropyran-2-methyl 3,4-dihydropyran-2-carboxylate; spiro ortho ester compounds prepared by the reaction of epoxy compounds with lactone; ethylenically unsaturated compounds such as vinylcyclohexane, isobutylene and polybutadiene; and derivatives of the above compounds.

These cationically polymerizable compounds may be used alone or as a mixture of two or more of them depending upon the desired performance.

Among the cationically polymerizable organic substances described above, alicyclic epoxy resins are particularly preferred in respect of cationic polymerizability, low viscosity, ultraviolet transmission, setting characteristics of thick film and volume shrinkage.

When at least 50% (by weight) of the cationically polymerizable organic substance is composed of an aliphatic epoxy resin, the resin composition exhibits particularly excellent characteristics as a resin for optical molding.

Component (b)

The actinic radiation-sensitive initiator for cationic polymerization (b) to be used is a compound which generates a cationic polymerization-initiating substance by irradiation with an actinic radiation. Particularly, a group of onium double salts which can generate Lewis acids capable of initiating polymerization by the irradiation are preferred.

Representative examples of the onium double salt include those represented by the general formula:

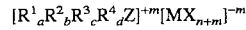

wherein the cation is an onium; Z is S, Se, Te, P, As, Sb, Bi, 0, halogen (such as I, Br or Cl) or N≡N; $R^1$, $R^2$, $R^3$ and $R^4$ may be the same or different from each other and are each an organic group; a, b, c and d are each an integer of 0 to 3 with the proviso that the sum total of a, b, c and d is equal to the valance number of Z; M is a central atom of the halide complex and is a metal or metalloid such as B, P, As, Sb, Fe, Sn, Bi, Al, Ca, In, Ti, Zn, Sc, V, Cr, Mn or Co; X is a halogen atom; m is the net charge of the halide complex ion and n is the valance number of M.

Particular examples of the anion $MX_{n+m}$ of the above general formula include tetrafluoroborate ($BF_4^-$), hexafluorophosphate ($PF_6^-$), hexafluoroantimonate ($SbF_6^-$), hexafluoroarsenate ($AsF_6^-$) and hexachloroantimonate ($SbCl_6^-$).

Further, anions of the general formula: $MX_n(OH)^-$ can be used. Other anions which can be used according to the present invention include perchlorate ion ($ClO_4^-$), trifluoromethyl sulfite ion ($CF_3SO_3^-$), fluorosulfonate ion ($FSO_3^-$), toluenesulfonate anion and trinitrobenzenesulfonate anion.

Among the onium salts described above, it is particularly effective to use an aromatic onium salt as a cationic polymerization initiator. Particularly preferred examples of the aromatic onium salt include aromatic halonium salts described in Japanese Patent Laid-Open Nos. 151996/1975 and 158680/1975; aromatic onium salts of group VIA elements described in Japanese Patent Laid-Open Nos. 151997/1975, 30899/1977, 55420/1981 and 125105/1980; aromatic onium salts of group VA elements described in Japanese Patent Laid-Open No. 158698/1975; oxosulfoxonium salts described in Japanese Patent Laid-Open Nos. 8428/1981, 149402/1981 and 192429/1982; aromatic diazonium salts described in Japanese Patent Publication No. 17040/1974 and thiopyrrylium salts described in U.S. Pat. No. 4,139,655. Further, initiators comprising an aluminum complex and a photodecomposable silicon compound may be preferably used.

The cationic polymerization initiators described above may be used together with a photosensitizer such as benzophenone, benzoin isopropyl ether or thioxanthone.

The resin composition according to the present invention may contain the radiation-sensitive initiator for cationic polymerization (b) in an amount of 0.1 to 15 parts by weight, preferably 0.5 to 7 parts by-weight per 100 parts by weight of the radiation-curable and cationically polymerizable organic substance (a) used.

Component (c)

The actinic radiation-curable and radical-polymerizable organic substance (c) to be used in the present invention is a radical-polymerizable compound which is polymerizable or crosslinkable by irradiation with an actinic radiation in the presence of an actinic radiation-sensitive initiator for radical polymerization (d) and may be one or more members selected from among acrylate, methacrylate, allylurethane, unsaturated polyester and polythiol compounds. Among these radical-polymerizable compounds, those having at least one acrylate group per molecule are preferable and examples thereof include epoxy acrylate, urethane acrylate, polyester acrylate, polyether acrylate and acrylates of alcohols.

Preferred examples of the epoxy acrylate include those prepared by the reaction of acrylic acid with conventional aromatic, alicyclic or aliphatic epoxy resins, among which acrylates of aromatic epoxy resins are particularly preferred. Such acrylates can be prepared by reacting acrylic acid with polyglycidyl ether of polyhydric alcohol having at least one aromatic nucleus or adduct thereof with alkylene oxide. Particular examples thereof include acrylates prepared by reacting acrylic acid with glycidyl ether obtained by the reaction of epichlorohydrin with bisphenol A or adduct thereof with alkylene oxide and acrylates prepared by the reaction of epoxynovolac resins with acrylic acid.

Preferred examples of the urethane acrylate include acrylates prepared by reacting isocyanates with one or more polyesters or polyethers containing a hydroxyl group and hydroxyl-containing acrylate; and acrylates prepared by reacting isocyanate with hydroxyl-containing acrylate. The hydroxyl-containing polyester to be used in the above preparation is preferably one prepared by reacting one or more aliphatic polyhydric alcohols with one or more polybasic acids. Examples of the aliphatic polyhydric alcohol include 1,3-butanediol, 1,4-butanediol, 1,6-hexanediol, diethylene glycol, triethylene glycol, neopentyl glycol, polyethylene glycol, polypropylene glycol, trimethylolpropane, glycerin, pentaerythritol and dipentaerythritol, while those of the polybasic acid include adipic acid, terephthalic acid, phthalic anhydride and trimellitic acid. The hydroxyl-containing polyether is preferably one prepared by the addition of an aliphatic polyhydric alcohol with one or more alkylene oxides. Examples of the aliphatic polyhydric alcohol include 1,3-butanediol, 1,4-butanediol, 1,6-hexanediol, diethylene glycol, triethylene glycol, neopentyl glycol, polyethylene glycol, polypropylene glycol, trimethylopropane, glycerin, pentaerythritol and dipentaerythritol, while those of the alkylene oxide include ethylene oxide and propylene oxide. The hydroxy-containing acrylate is preferably one prepared by the esterification of an aliphatic polyhydric alcohol with acrylic acid. Examples of the aliphatic polyhydric alcohol include ethylene glycol, 1,3-butanediol, 1,4-butanediol, 1,6-hexanediol, diethylene glycol, triethylene glycol, neopentyl glycol, polyethylene glycol, polypropylene glycol, trimethylolpropane, glycerin, pentaerythritol and dipentaerythritol. Among the hydroxyl-containing acrylates described above, those prepared by the esterification of an aliphatic dihydric alcohol with acrylic acid (for example, 2-hydroxyethyl acrylate) are particularly preferred. Preferable isocyanates are those each having at least one isocyanate group in its molecule, among which diisocyanates such as tolylene diisocyanate, hexamethylene diisocyanate and isophorone diisocyanate are particularly preferred.

The polyester acrylate is preferably one prepared by the reaction of acrylic acid with hydroxyl-containing polyester. The hydroxyl-containing polyester to be used in the reaction is preferably one prepared by the esterification of one or more aliphatic polyhydric alcohols with one or more members selected from among mono- and poly-basic acids and phenols. Examples of the aliphatic polyhydric alcohol include 1,3-butanediol, 1,4-butanediol, 1,6-hexanediol, diethylene glycol, triethylene glycol, neopentyl glycol, polyethylene glycol, polypropylene glycol, trimethylolpropane, glycerin, pentaerythritol and dipentaerythritol. Examples of the monobasic acid include formic, acetic, butylcarboxylic and benzoic acids. Examples of the polybasic acid include adipic acid, terephthalic acid phthalic anhydride and trimellitic acid, while those of the phenol include phenol and p-nonylphenol.

The polyether acrylate is preferably one prepared by reacting a hydroxyl-containing polyether with acrylic acid. The hydroxyl-containing polyether to be used in this reaction is preferably one prepared by the addition of an aliphatic polyhydric alcohol with one or more alkylene oxides. Examples of the aliphatic polyhydric alcohol include 1,3-butanediol, 1,4-butanediol, 1,6-hexanediol, diethylene glycol, triethylene glycol, neopentyl glycol, polyethylene glycol, polypropylene glycol, trimethylolpropane, glycerin, pentaerythritol and dipentaerythritol, while those of the alkylene oxide include ethylene oxide and propylene oxide.

The acrylate of an alcohol is preferably one prepared by reacting acrylic acid with an aromatic or aliphatic alcohol having at least one hydroxyl group in its molecule or an adduct thereof with alkylene oxide. Examples thereof include 2-ethylhexyl acrylate, 2-hydroxyethyl acrylate, 2-hydroxypropyl acrylate, isoamyl acrylate, lauryl acrylate, stearyl acrylate, isooctyl acrylate, tetrahydrofurfuryl acrylate, isobornyl acrylate, benzyl acrylate, 1,3-butanediol diacrylate, 1,4-butanediol diacrylate, 1,6-hexanediol diacrylate, diethylene glycol diacrylate, triethylene glycol diacrylate, neopentyl glycol diacrylate, polyethylene glycol diacrylate, polypropylene glycol diacrylate, trimethylolpropane triacrylate, pentaerythritol triacrylate and dipentaerythritol hexaacrylate.

Among the acrylates described above, polyacrylates of polyhydric alcohols are particularly preferred.

The radical-polymerizable organic substances described above may be used alone or as a mixture of two or more of them depending upon the necessitated performance.

Among the radiation-curable and radical-polymerizable organic substances (c) described above, it is particularly preferable to use a compound having at least three unsaturated double bonds in its molecule.

Component (d)

The actinic radiation-sensitive initiator for radical polymerization (d) to be used in the present invention is a compound which can generate a substance capable of initiating radical polymerization by irradiation with an actinic radiation and examples thereof include various ketones such as acetophenone, benzoin ether, benzil, benzophenone and thioxanthone compounds. Examples of the acetophenone compound include diethoxyacetophenone, 2-hydroxymethyl-1-phenylpropan-1-one, 4'-isopropyl-2-hydroxy-2-methylpropiophenone, 2-hydroxy-2-methylpropiophenone, p-dimethylaminoacetophenone, p-tert-butyldichloroacetophenone p-tert-butyltrichloroacetophenone and p-azidobenzalacetophenone. Examples of the benzoin ether compound include benzoin, benzoin methyl ether, benzoin ethyl ether, benzoin isopropyl ether, benzoin n-butyl ether and benzoin isobutyl ether. Examples of the benzil compound include benzil, benzil dimethyl ketal, benzil β-methoxyethyl acetal and 1-hydroxycyclohexyl phenyl ketone. Examples of the benzophenone compound include benzophenone, methyl o-benzoylbenzoate, Michler's ketone. 4,4'-bisdiethylaminobenzophenone and 4,4'-dichlorobenzophenone and those of the thioxanthone compound include thioxanthone, 2-methylthioxanthone, 2-ethylthioxanthone, 2-chlorothioxanthone and 2-isopropylthioxanthone.

The radiation-sensitive initiators for radical polymerization (d) described above may be used alone or as a mixture of two or more of them depending upon the desired performance.

Now, the proportions of (a) the radiation-curable and cationically polymerizable organic substance, (b) the radiation-sensitive initiator for cationic polymerization, (c) the radiation-curable and radical-polymerizable organic substance and (d) the radiation-sensitive initiator for radical polymerization will be described, wherein all proportions will be shown by parts (by weight).

According to the present invention, it is preferable that the radiation-curable and cationically polymerizable organic substance (a) and the radiation-curable and radical-polymerizable organic substance (c) be contained in amounts of 40 to 95 parts and 5 to 60 parts, respectively, in a sum total of both of 100 parts. Particularly, a composition characterized by containing the radiation-curable and cationically polymerizable organic substance (a) and the radiation-curable and radical-polymerizable organic substance (c) in amounts of 50 to 90 parts and 10 to 50 parts, respectively, exhibits excellent characteristics as a resin composition for optical molding.

According to the present invention, a plurality of the radiation-curable and cationically polymerizable organic substances and/or a plurality of the radiation-curable and radical-polymerizable organic substances may be used as the components (a) and (c), respectively to attain the characteristics desired as a resin composition for optical molding.

The amount of the radiation-sensitive initiator for cationic polymerization (b) to be used may be 0.1 to 10 parts preferably 0.5 to 6 parts per 100 parts of the radiation-curable organic substance, i.e., the mixture of the radiation-curable and cationically polymerizable organic substance (a) and the radiation-curable and radical-polymerizable substance (c). Meanwhile, the amount of the radiation-sensitive initiator for radical polymerization (d) to be used may be 0.1 to 10 parts, preferably 0.2 to 5 parts, per 100 parts of the radiation-curable organic substance used. A plurality of the radiation-sensitive initiators for cationic polymerization and/or a plurality of the radiation-sensitive initiators for radical polymerization may be used as the components (b) and/or (d), respectively, to attain the characteristics desired as a resin composition for optical molding. Further, these polymerization initiators may be each added to the radiation-curable organic substance in a state dissolved in a proper solvent.

If the radiation-curable and cationically polymerizable organic substance (a) is contained in too large an amount, i.e., if the radiation-curable and radically-polymerizable organic substance (c) is contained in too small an amount, the resulting composition will be disadvantageous in that the resolution of the composition is poor, because when it is cured with an actinic radiation, the polymerization thereof easily proceeds from the area irradiated with the actinic radiation toward the peripheral area thereof, and that it takes several seconds until the completion of the polymerization after the irradiation with the actinic radiation, although the composition will exhibit a reduced volume shrinkage in the curing thereof with the actinic radiation by virtue of less effect of atmospheric oxygen to therefor cause less distortion or fracture, and will be molded in a shortened time, because the composition can be easily prepared as a low-viscosity one. On the contrary, if the radiation-curable and radical-polymerizable organic substance (c) is contained in too large an amount, i.e., if the radiation-curable and cationically polymerizable organic substance (a) is contained in too small an amount, the resulting composition will be disadvantageous in that the curing of the composition with an actinic radiation is hindered by atmospheric oxygen, that the volume shrinkage thereof caused by the curing is so large that the resulting cured product is liable to cause distortion or fracture and that it is significantly irritant to the skin, particularly when a low-viscosity radical-polymerizable resin is used for lowering the viscosity of the composition, although the composition will exhibit high resolution, because the polymerization hardly proceeds from the area irradiated with the actinic radiation toward the peripheral area thereof, and will take scarcely any time until the completion of the polymerization after the irradiation with the actinic radiation. Thus, both the compositions are unsuitable for optical molding.

The resin composition of the present invention wherein at least 40% by weight of the radiation-curable and cationically polymerizable organic substance (a) is composed of an alicyclic epoxy resin having at least two epoxy groups in its molecule and at least 50% by weight of the radiation-curable and radical-polymerizable organic substance (c) is composed of a compound having at least three unsaturated double bonds in its molecule is excellent in sensitivity to an actinic radiation, mechanical strengths and resolution and exhibits a shrinkage of 3% of below, thus being particularly suitable for optical molding.

Component (e)

The filler (e) to be used in the present invention is an organic or inorganic, powdery, fibrous or flaky material and examples thereof include mica powder, silica powder, quartz powder, carbon powder, calcium carbonate, alumina, aluminum hydroxide, aluminum silicate, zirconium silicate, iron oxides, barium sulfate, glass powder, glass fiber, asbestos, talc, diatomaceous earth, kaolin, dolomite, powdered metals, titanium oxide, pulp powder, nylon powder, crosslinked polyethylene powder crosslinked polystyrene powder, crosslinked phenolic resin powder, crosslinked urea resin powder, crosslinked melamine resin powder, crosslinked polyester resin powder, crosslinked epoxy resin powder and crosslinked polymethyl methacrylate resin powder.

The filler to be used for the resin composition for optical molding according to the present invention must satisfy requirements that it hinders neither cationic nor radical polymerization, that it hardly reflect or scatter laser beams, that it does not affect the heat stability of the resinous components and that the mixture thereof with the resinous components has a relatively low viscosity.

Preferred examples of the filler to be used for the preparation of the resin composition of the present invention include silica, calcium carbonate, glass powder, barium sulfate, talc, mica powder, crosslinked polystyrene powder and crosslinked epoxy resin powder.

These fillers may be used alone or as a mixture of two or more of them depending upon the desired performance.

Now, the proportions of (a) the radiation-curable and cationically polymerizable organic substance, (b) the radiation-sensitive initiator for cationic polymerization, (c) the radiation-curable and radical-polymerizable organic substance, (d) the radiation-sensitive initiator for radical polymerization and (e) the filler according to the present invention will be described, wherein all proportions will be shown by parts (by weight).

According to the present invention, it is preferable to use the filler in an amount of 0.5 to 30 parts, still preferably 1 to 20 parts, per 100 parts of the mixture of the radiation-curable and cationically polymerizable organic substance (a) and the radiation-curable and radical-polymerizable organic substance (c) from the standpoint of the optical molding characteristics of the resulting composition.

According to the present invention, a plurality of the fillers may be used as the component (e) to thereby attain the characteristics desirable as a resin composition for optical molding.

If the radiation-curable and cationically polymerizable organic substance (a) is contained in too large an amount, i.e., if the radiation-curable and radical-polymerizable organic substance (c) is contained in too small an amount, the resulting composition will be disadvantageous in that the resolution of the composition is poor, because when it is cured with an actinic radiation, the polymerization thereof easily proceeds from the area irradiated with the actinic radiation toward the peripheral area thereof, and that it takes several seconds until the completion of the polymerization after the irradiation with the actinic radiation, although the composition will exhibit a reduced volume shrinkage in the curing thereof with the actinic radiation by virtue of less effect of atmospheric oxygen to therefor cause less distortion or fracture, and will be molded in a shortened time, because the composition can be easily prepared as a low-viscosity one. On the contrary, if the radiation-curable and radical-polymerizable organic substance (c) is contained in too large an amount, i.e., if the radiation-curable and cationically polymerizable organic substance (a) is contained in too small an amount, the resulting composition will be disadvantageous in that the curing of the composition with an actinic radiation is hindered by atmospheric oxygen, that the volume shrinkage thereof caused by the curing is so large that the resulting cured product is liable to cause distortion or fracture and that it is significantly irritant to the skin, particularly when a low-viscosity radical-polymerizable resin is used for lowering the viscosity of the composition, although the composition will exhibit high resolution, because the polymerization hardly proceeds from the area irradiated with the actinic radiation toward the peripheral area thereof, and will take scarcely any time until the completion of the polymerization after the irradiation with the actinic radiation. Thus, both the compositions are unsuitable for optical molding.

The resin composition for optical molding further containing (e) the filler in an amount of 0.5 to 30 parts per 100 parts of the mixture of (a) the radiation-curable and cationically polymerizable organic substance and (c) the radiation-curable and radical-polymerizable organic substance exhibits a remarkably reduced cure shrinkage and improved mechanical strengths to give a cured product having reduced distortion, thus being excellent as a resin composition for optical molding. When the filler is contained in an amount of 1 to 20 parts per 100 parts of the mixture of the radiation-curable and cationically polymerizable organic substance (a) and the radiation-curable and radical-polymerizable organic substance (c), the resulting resin composition is particularly suitable for optical molding.

The resin composition of the present invention wherein at least 40% by weight of the radiation-curable and cationically polymerizable organic substance (a) is composed of an alicyclic epoxy resin having at least two epoxy groups in its molecule and at least 50% by weight of the radiation-curable and radical-polymerizable organic substance (c) is composed of a compound having at least three unsaturated double bonds in its molecule is excellent in sensitivity to an actinic radiation, mechanical strength and resolution and exhibits a shrinkage of 3% or below, thus being particularly suitable for optical molding.

Component (a')

The resin composition for optical molding according to the present invention may contain (a') an actinic radiation-curable and cationically polymerizable organic substance comprising at least 40% by weight of an alicyclic epoxy resin having at least two epoxy groups in its molecule and at least 30% by weight of a vinyl ether resin having at least two vinyl groups in its molecule.

Representative examples of the alicyclic epoxy resin having at least two epoxy groups in its molecule which is one of the constituents of the essential component (a') constituting the resin composition for optical molding according to the present invention include hydrogenated bisphenol A diglycidyl ether, 3,4-epoxycyclohexylmethyl 3,4-epoxycyclohexanecarboxylate, 2-(3,4-epoxycyclohexyl-5,5-spiro-3,4-epoxy) cyclohexane-m-dioxane, bis (3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexyl 3,4-epoxy-6-methylcyclohexanecarboxylate, methylenebis-(3,4-epoxycyclohexane), dicyclopentadiene diepoxide, di(3,4-epoxycyclohexylmethyl)ether of ethylene glycol, ethylenebis(3,4-epoxycyclohexanecarboxylate) dioctyl epoxyhexahydrophthalate and di-2-ethylhexyl epoxyhexahydrophthalate.

The vinyl ether resin having at least two vinyl groups in its molecule which is another constituent of the essential component (a') include ethylene glycol divinyl ether, diethylene glycol divinyl ether, triethylene glycol divinyl ether, alkyl vinyl ether, 3,4-dihydropyran-2-methyl (3,4-dihydropyran-2carboxylate), dipropylene glycol divinyl ether, triethylene glycol divinyl ether, butanediol divinyl ether, divinyl ether of an adduct of butanediol with ethylene oxide and divinyl ethers of bisphenol A, hydrogenated bisphenol A or bisphenol A of pendant type.

The resin composition according to the present invention exhibits excellent cationic polymerizability, reduction of viscosity, ultraviolet transmission, curability of thin film, volume shrinkage and resolution by virtue of the presence of an alicyclic epoxy resin having at least two epoxy groups in its molecule in an amount exceeding a predetermined one. Further, the cationic polymerizability of the resin composition is remarkably enhanced by the presence of a vinyl ether resin having at least two vinyl groups in its molecule of an amount exceeding a predetermined one.

Now, the proportions of (a') the radiation-curable and cationically polymerizable organic substance, (b) the radiation-sensitive initiator for cationic polymerization, (c) the radiation-curable and radical-polymerizable organic substance and (d) the radiation-sensitive initiator for radical polymerization will be described, wherein all proportions will be shown by parts (by weight).

According to the present invention, it is preferable that the radiation-curable and cationically polymerizable organic substance (a') and the radiation-curable and radical-polymerizable organic substance (c) be contained in amounts of 40 to 95 parts and 5 to 60 parts, respectively, in a sum total of both of 100 parts. Particularly, a composition characterized by containing the radiation-curable and cationically polymerizable organic substance (a') and the radiation-curable and radical-polymerizable organic substance (c) in amounts of 50 to 90 parts and 10 to 50 parts, respectively, exhibits excellent characteristics as a resin composition for optical molding.

According to the present invention, a plurality of the radiation-curable and cationically polymerizable organic substances and/or a plurality of the radiation-curable and radical-polymerizable organic substances may be used as the components (a') and (c), respectively, to attain the characteristics desired as a resin composition for optical molding.

The amount of the radiation-sensitive initiator for cationic polymerization (b) to be used may be 0.1 to 10 parts, preferably 0.5 to 6 parts per 100 parts of the radiation-curable organic substance, i.e., the mixture of the radiation-curable and cationically polymerizable organic substance (a') and the radiation-curable and radical-polymerizable substance (c). Meanwhile, the amount of the radiation-sensitive initiator for radical polymerization (d) to be used may be 0.1 to 10 parts, preferably 0.2 to 5 parts per 100 parts of the radiation-curable organic substance used. A plurality of the radiation-sensitive initiators for cationic polymerization and/or a plurality of the radiation-sensitive initiators for radical polymerization may be used as the components (b) and/or (d), respectively, to attain the characteristics desired as a resin composition for optical molding. Further, these polymerization initiators may be each added to the radiation-curable organic substance in a state dissolved in a proper solvent.

If the radiation-curable and cationically polymerizable organic substance (a') is contained in too large an amount, i.e., if the radiation-curable and radical-polymerizable organic substance (c) is contained in too small an amount, the resulting composition will be disadvantageous in that the resolution of the composition is poor, because when it is cured with an actinic radiation, the polymerization thereof easily proceeds from the area irradiated with the actinic radiation toward the peripheral area thereof, and that it takes several seconds until the completion of the polymerization after the irradiation with the actinic radiation, although the composition will exhibit a reduced volume shrinkage in the curing thereof with the actinic radiation by virtue of less effect of atmospheric oxygen to therefor cause less distortion or fracture, and will be molded in a shortened time, because the composition can be easily prepared as a low-viscosity one. One the contrary, if the radiation-curable and radical-polymerizable organic substance (c) is contained in too large an amount, i.e., if the radiation-curable and cationically polymerizable organic substance (a') is contained in too small an amount, the resulting composition will be disadvantageous in that the curing of the composition with an actinic radiation is hindered by atmospheric oxygen, that the volume shrinkage thereof caused by the curing is so large that the resulting cured product is liable to cause distortion or fracture and that it is significantly irritant to the skin, particularly when a low-viscosity radical-polymerizable resin is used for lowering the viscosity of the composition, although the composition will exhibit high resolution, because the polymerization hardly proceeds from the area irradiated with the actinic radiation toward the peripheral area thereof, and will take scarcely any time until the completion of the polymerization after the irradiation with the actinic radiation. Thus, both the compositions are unsuitable for optical molding.

The resin composition of the present invention wherein a radiation-curable and cationically polymerizable organic substance (a') comprising at least 40% by weight of an alicyclic epoxy resin having at least two epoxy groups in its molecule and at least 30% by weight of a vinyl ether resin having at least two vinyl groups in its molecule is contained and at least 50% by weight of the radiation-curable and radical-polymerizable organic substance (c) is composed of a compound having at least three unsaturated double bonds in its molecule is excellent in sensitivity to an actinic radiation, mechanical strength is and resolution and exhibits a shrinkage of 3% or below, thus being particularly suitable for optical molding.

If necessary, the resin composition for optical molding according to the present invention may contain other materials in suitable amounts, as far as the effect of the present invention is not adversely affected. Examples of such materials include radical-polymerizable organic substances other than the above-mentioned cationically polymerizable organic substances; heat-sensitive polymerization initiators; various additives for resins such as coloring agents such as pigment and dye, antifoaming agent, leveling agent, thickening agent, flame retardant and antioxidant; fillers such as silica, glass powder, ceramic powder and metal powder and modifier resins. Particular examples of the radical-polymerizable organic substance include acrylate resins such as epoxy acrylate, urethane acrylate, polyester acrylate and polyether acrylate, while those of the heat-sensitive polymerization initiator includes aliphatic onium salts disclosed in Japanese Patent Laid-Open Nos. 49613/1982 and 37004/1983.

The viscosity of the composition according to the present invention at ordinary temperature is preferable 2000 cps or below, still preferably 1000 cps or below. If the viscosity thereof is too high, the molding time will be long to result in poor workability. It is generally desirable from the standpoint of dimensional accuracy that a molding resin composition exhibit a small volume shrinkage in the curing. It is preferable that the resin composition of the present invention exhibit a volume shrinkage of at most 5%, still preferably at most 3% in the curing.

The present invention can be practically carried out by, for example, a process disclosed in Japanese Patent Laid-Open No. 247515/1985, which comprises putting a resin composition for optical molding according to the present invention in a container, inserting a photoconductor into the resin composition and selectively feeding an actinic radiation necessary for the curing through the photoconductor, while moving the container and the photoconductor relatively, thus molding the composition into a solid having an objective shape. The actinic radiation to be used in the curing of the composition according to the present invention may be ultraviolet ray, electron beam, X-ray, radiation or radiofrequency radiation, among which ultraviolet ray having a wavelength of 1800 to 5000 Å is economical. The source thereof includes ultraviolet laser, mercury lamp, xenon lamp, sodium lamp, alkali metal lamp and so on, among which laser beams are particularly preferred. The use of laser beams shortens the molding time by virtue of its high energy level and enhances the molding accuracy by virtue of its excellent condensability. Further, it is effective to use a point source obtained by condensing the ultraviolet rays emitted from various lamps such as a mercury lamp. The selective feeding of the actinic radiation necessary for the curing of the composition can be carried out by irradiating the resin composition alternately with at least two light fluxes each having a wavelength corresponding to twice that suitable for the curing of the composition and having the same phase in such a way that the fluxes cross each other in the composition, thus obtaining the radiation necessary for the curing of the composition by diphotonic absorption. The above irradiation may be carried out while moving the position of crossing of the fluxes. The above light fluxes having the same phase can be given by, for example, laser beams.

The curing of the composition with an actinic radiation according to the present invention proceeds through cationic and radical polymerization. Therefor, the composition may be heated to a temperature of about 30° to 100° C. during the irradiation thereof with the actinic radiation to thereby accelerate the crosslinking and curing thereof effectively. Alternatively, the composition may be molded with the actinic radiation and thereafter treated by heating to 40° to 400° C. or irradiation with UV rays from a mercury lamp to thereby give a molded article improved in mechanical strengths.

The resin composition for optical molding according to the present invention is suitable for preparing a three-dimensional model by stacking laminar moldings and can be molded by CAD/CAM and docking without using any mold into a model of any complicated shape having a freely curved surface or the like with high accuracy, thus being industrially valuable extremely. Therefor, the resin composition of the present invention is applicable to various uses including a model for examining the appearance of an article in the course of designing a model for checking the fitness between components, a wooden model for preparing a casting mold and a model for the preparation of a mold by profiling.

Particularly, the composition is applicable to the preparation of models of various articles having curved surfaces, such as automobile, electronic or electrical component, furniture, structural component for building, toy, container, casting and doll.

Since the resin composition for optical molding according to the present invention contains both an actinic radiation-curable and cationically polymerizable organic substance and an actinic radiation-curable and radical-polymerizable organic substance, it has both of the advantages inherent in the radiation-curable and cationically polymerizable organic substance and those inherent in the radiation-curable and radical-polymerizable organic substance. A cationically polymerizable resin composition is advantageous in that the curing of the resin composition with an actinic radiation is not hindered by atmospheric oxygen at all, that the volume shrinkage of the resin composition caused by curing is so small that the obtained cured product hardly causes distortion or fracture and is excellent in strengths and that a low-viscosity resin composition can be easily obtained to shorten the molding time. However, it is disadvantageous in that the curing (polymerization) thereof with an actinic radiation so easily proceeds from the area irradiated with the actinic radiation toward the peripheral area thereof that the resolution is poor and that it takes several seconds until the completion of the polymerization thereof after the irradiation thereof with the actinic radiation. Meanwhile, a radical-polymerizable resin composition is advantageous in that the curing (polymerization) of the composition with an actinic radiation hardly proceeds from the area irradiated with the actinic radiation toward the peripheral area thereof to give excellent resolution and that it takes scarcely any time until the completion of the polymerization thereof after the irradiation with the actinic radiation. However, it is disadvantageous in that the polymerization thereof is hindered by atmospheric oxygen, that the cure shrinkage is significant, that the cured product thereof has poor mechanical strengths and that it is irritant to the skin and has strong odor, particularly when the viscosity of the composition is low.

The resin composition for optical molding according to the present invention which comprises (a) the radiation-curable and cationically polymerizable organic substance, (b) the radiation-sensitive initiator for cationic polymerization, (c) the radiation-curable and radical-polymerizable organic substance, (d) the radiation-sensitive initiator for radical polymerization and (e) the inorganic filler has the following characteristics: the composition is hardly affected by atmospheric oxygen; the volume shrinkage thereof caused by curing is so small that the cured product hardly causes distortion or fracture; a low-viscosity resin composition can be easily obtained to shorten the molding time; the polymerization of the composition with an actinic radiation hardly proceeds from the area irradiated with the actinic radiation toward the peripheral area thereof to give excellent resolution; it takes scarcely any time until the completion of the polymerization after the irradiation with the actinic radiation; and the cured product thereof is excellent in mechanical strengths and hardness.

[EXAMPLE]

Representative embodiments of the present invention will be described in detail as Examples, though the present invention is not limited by them. In the following Examples, all parts are by weight.

Example 1

100 parts of a cationically polymerizable organic substance comprising 80 parts of 3,4-epoxycyclohexylmethyl 3,4-epoxycyclohexanecarboxylate and 20 parts of 1,4-butanediol diglycidyl ether was sufficiently mixed with 2 parts of an actinic radiation-sensitive initiator for cationic polymerization, bis[4-(diphenylsulfonio)phenyl]sulfide bisdihexafluoroantimonate, to give a resin composition for molding having a low viscosity of 160 cps. This resin composition was molded into a cylinder having a diameter of 12 mm, a height of 15 mm and a thickness of 0.5 mm by the use of laboratory molding equipment comprising a three-dimensional numerically controlled table on which a container for a resin composition was placed, a helium-cadmium laser (of wavelength of 325 nm) and a control unit mainly composed of an optical system and a personal computer. This cylinder was free from distortion and was extremely excellent in molding accuracy, mechanical strengths and hardness.

Example 2

A cationically polymerizable organic substance comprising 30 parts of bisphenol A diglycidyl ether, 60 parts of 3,4-epoxycyclohexylmethyl 3,4-epoxycyclohexanecarboxylate and 10 parts of vinylcyclohexene dioxide was sufficiently mixed with 1.5 parts of an actinic radiation-sensitive polymerization initiator, triphenylsulfonium hexafluoroantimonate, to give a homogeneous resin composition for optical molding. This composition was molded by heating to 60° C. into a complicated conical article with the same laboratory equipment of laser molding as that used in Example 1. The composition was excellent in curability with laser beams and gave a molded article excellent in accuracy and mechanical strengths.

Example 3

85 parts of 3,4-epoxycyclohexylmethyl 3,4-epoxycyclohexanecarboxylate, 15 parts of dipentaerythritol hexaacrylate, 3 parts of triphenylsulfonium hexafluoroantimonate and 1 part of benzophenone were sufficiently mixed with each other to prepare a resin composition for optical molding. This composition was molded into a cup with the same laboratory molding equipment as that used in Example 1. This cup was free from distortion and was excellent in molding accuracy.

Comparative Example 1

An actinic radiation-curable and radical-polymerizable resin composition comprising 70 parts of polyester acrylate, 30 parts of trimethylolpropane triacrylate and 3 parts of isobutyl benzoin ether was molded into a cylinder with the same equipment as that used in Example 1 according to the same process as that described in Example 1. The composition was so poor in sensitivity to laser beams that the molding thereof took a long time. Further, the obtained cylinder caused distortion due to significant cure shrinkage to result in poor molding accuracy and mechanical strengths.

Example 4

85 parts of 3,4-epoxycyclohexylmethyl 3,4-epoxycyclohexanecarboxylate as the radiation-curable and cationically polymerizable organic substance (a), 3 parts of bis-[4-(diphenylsulfonio)phenyl] sulfide bisdihexafluoroantimonate as the radiation-sensitive initiator for cationic polymerization (b), 15 parts of dipentaerythritol hexaacrylate as the radiation-curable and radical-polymerizable organic substance (c) and 1 part of benzophenone as the radiation-sensitive initiator for radical polymerization (d) were sufficiently mixed with each other to give a resin composition for optical molding. This composition was molded into a cone having a base diameter of 12 mm, a height of 15 mm and a thickness of 0.5 mm by the use of laboratory equipment of optical molding comprising a three-dimensional numerically controlled table on which a container for a resin composition was placed, a helium-cadmium laser (wavelength of 325 mm) and a control unit mainly composed of an optical system and a personal computer. This cone was free from distortion to exhibit extremely high molding accuracy and was excellent in mechanical strengths.

Example 5

50 parts of 3,4-epoxycyclohexylmethyl 3,4-epoxycyclohexanecarboxylate and 20 parts of 1,4-butanediol diglycidyl ether as the radiation-curable and cationically polymerizable organic substance (a), 3 parts of triphenylsulfonium hexafluoroantimonate as the radiation-sensitive initiator for cationic polymerization (b), 20 parts of dipentaerythritol hexaacrylate and 10 parts of trimethylolpropane triacrylate as the radiation-curable and radical-polymerizable organic substance (c) and 1 part of benzil dimethyl ketal as the radiation-sensitive initiator for radical polymerization (d) were mixed with each other to prepare a resin composition for optical molding. This composition was molded into a hanging bell-shaped article with the same laboratory equipment of laser molding as that used in Example 4. This article was free from distortion to exhibit extremely high molding accuracy and was excellent in curability with laser beams. Further, the composition was easily handlable by virtue of its low-viscosity and was excellent in curability with laser beams.

Example 6

20 parts of bisphenol A diglycidyl ether, 30 parts of 3,4-epoxycyclohexylmethyl 3,4-epoxycyclohexanecarboxylate and 10 parts of vinylcyclohexene oxide as the radiation-curable and cationically polymerizable organic substance (a), 2 parts of triphenylsulfonium hexafluoroantimonate as the radiation-sensitive initiator for cationic polymerization, 15 parts of bisphenol A epoxyacrylate and 25 parts of pentaerythritol triacrylate as the radiation-curable and radical-polymerizable organic substance (c) and 2 parts of 2,2-diethoxyacetophenone as the radiation-sensitive initiator for radical polymerization (d) were sufficiently mixed with each other to give a resin composition for optical molding. The composition was molded into a cup by heating to 60° C. with the same laboratory equipment of laser molding as that used in Example 1. This cup was free from distortion to exhibit excellent molding accuracy.

Example 7

50 parts of 3,4-epoxycyclohexylmethyl 3,4-epoxycyclohexanecarboxylate, 10 parts of 1,4-butanediol diglycidyl ether and 20 parts of triethylene glycol divinyl ether as the radiation-curable and cationically polymerizable organic substance (a) 20 parts of dipentaerythritol hexaacrylate as the radiation-curable and radical-polymerizable organic substance (c), 2 parts of bis[4-(diphenylsulfonio)phenyl] sulfide bisdihexafluoroantimonate as the radiation-sensitive initiator for cationic polymerization (b) and 1 part of benzophenone as the radiation-sensitive initiator for radical polymerization (d) were sufficiently mixed with each other to give a resin composition for optical molding. This composition was molded into a hanging bell-shaped article with the same laboratory equipment for laser molding as that used in Example 4. This article was free from distortion and was excellent in mechanical strengths, molding accuracy and surface smoothness.

Comparative Example 2

70 parts of bisphenol A epoxyacrylate, 30 parts of trimethylolpropane triacrylate and 3 parts of benzil dimethyl ketal were sufficiently mixed with each other to prepare an actinic radiation-curable and radical-polymerizable resin composition. This composition was molded into a conical article similar to that prepared in Example 4 with the same laboratory equipment as that used in Example 4. This article caused distortion due to significant cure shrinkage to result in poor molding accuracy.

Example 8

65 parts of 3,4-epoxycyclohexylmethyl 3,4-epoxycyclohexanecarboxylate and 20 parts of 1,4-butanediol diglycidyl ether as the radiation-curable and cationically polymerizable organic substance (a), 3 parts of bis [4-(diphenylsulfonio)phenyl] sulfide bisdihexafluoroantimonate as the radiation-sensitive initiator for cationic polymerization (b), 15 parts of dipentaerythritol hexaacrylate as the radiation-curable and radical-polymerizable organic substance (c), 1 part of benzophenone as the radiation-sensitive initiator for radical polymerization (d) and 5 parts of silica powder as the filler (e) were sufficiently mixed with each other to give a resin composition for optical molding. This composition was molded into a cone having a base diameter of 12 mm and a thickness of 0.5 mm with laboratory equipment of optical molding comprising a three-dimensional numerically controlled table on which a container for a resin composition was placed, a helium-cadmium laser (wavelength of 325 nm) and a control unit mainly composed of an optical system and a personal computer. This cone was free from distortion to exhibit extremely high molding accuracy and was excellent in mechanical strengths.

In order to determine the molding accuracy, the base diameter of the cone was measured at ten arbitrary points to calculate the scatter. The mean error from the mean value (hereinafter referred to as "molding accuracy") was 1.1%, which means high accuracy. Further the cure shrinkage was calculated based on the difference in the specific gravity between the liquid resin and the cured product. The shrinkage was as very low as 2.0%.

Example 9

50 parts of 3,4-epoxycyclohexylmethyl 3,4-epoxycyclohexanecarboxylate and 20 parts of 1,4-bitanediol butanediol diglycidyl ether as the radiation-curable and cationically polymerizable organic substance (a), 3 parts of triphenylsulfonium hexafluoroantimonate as the radiation-sensitive initiator for cationic polymerization (b), 20 part of dipentaerythritol hexaacrylate and 10 parts of trimethylolpropane triacrylate as the radiation-curable and radical-polymerizable organic substance (c), 1 part of benzil dimethyl ketal as the radiation-sensitive initiator for radical polymerization (d) and 5 parts of glass powder as the filler (e) were sufficiently mixed with each other to prepare a resin composition for optical molding. This composition was molded into a hanging bell-shaped article with the same laboratory equipment of laser molding as that used in Example 1. This article was free from distortion to exhibit extremely high molding accuracy and was excellent in mechanical strengths. Further, the composition had a low viscosity to therefor be easily handlable and was excellent in curability with laser beams.

Separately, in order to determine the molding accuracy and the cure shrinkage, the above composition was molded into a cone similar to that prepared in Example 8. The molding accuracy was 1.2% and the cure shrinkage was 1.9%.

Example 10

10 parts of bisphenol A diglycidyl ether, 40 parts of 3,4-epoxycyclohexylmethyl 3,4-epoxycyclohexanecarboxylate and 10 parts of vinylcyclohexene oxide as the radiation-curable and cationically polymerizable organic substance (a), 2 parts of triphenylsulfonium hexafluoroantimonate as the radiation-sensitive initiator for cationic polymerization (b), 15 parts of bisphenol A epoxyacrylate and 25 parts of pentaerythritol triacrylate as the radiation-curable and radical polymerizable organic substance (c), 2 parts of 2,2-diethoxyacetophenone as the radiation-sensitive initiator for radical polymerization (d) and 10 parts of mica powder as the filler (e) were sufficiently mixed with each other to obtain a resin composition for optical molding. This composition was molded by heating to 60° C. into a cup with the same laboratory equipment of laser molding as that used in Example 1. This cup was free from distortion to exhibit excellent molding accuracy.

Meanwhile, in order to determine the molding accuracy and the cure shrinkage, the composition was molded into a cone similar to that prepared Example 8. The molding accuracy was 1.5% and the cure shrinkage was 1.9%.

Example 11

55 parts of 3,4-epoxycyclohexylmethyl 3,4-epoxycyclohexanecarboxylate, 10 parts of 1,4-butanediol diglycidyl ether and 15 parts of triethylene glycol divinyl ether as the radiation-curable and cationically polymerizable organic substance (a), 2 parts of bis[4-(diphenylsulfonio)phenyl] sulfide bisdihexafluoroantimonate as the radiation-sensitive initiator for cationic polymerization (b), 20 parts of dipentaerythritol hexaacrylate as the radiation-curable and radical-polymerizable organic substance (c), 1 part of benzophenone as the radiation-sensitive initiator for radical polymerization (d) and 20 parts of crosslinked polystyrene powder as the filler (e) were sufficiently mixed with each other to give a resin composition for optical molding. This composition was molded into a hanging bell-shaped article with the same laboratory equipment of laser molding as that used in Example 8. This article was free from distortion and was excellent in mechanical strengths, molding accuracy and surface smoothness.

Separately, in order to determine the molding accuracy and the cure shrinkage, the above composition was molded into a conical article similar to that prepared in Example 8. The molding accuracy was 0.9 % and the cure shrinkage was 1.6 %, which means extremely-high accuracy.

Example 12

55 parts of 3,4-epoxycyclohexylmethyl 3,4-epoxycyclohexanecarboxylate and 30 parts of bisphenol A divinyl ether as the radiation-curable and cationically polymerizable organic substance (a), 3 parts of bis[4-(diphenylsulfonyl)phenyl]sulfide bisdihexafluoroantimonate as the radiation-sensitive initiator for cationic polymerization (b), 15 parts of dipentaerythritol hexaacrylate as the radiation-curable and radical-polymerizable organic substance (c) and 1 part of benzophenone as the radiation-sensitive initiator for radical polymerization (d) were sufficiently mixed with each other to give a resin composition for optical molding. This composition was molded into a cone having a base diameter of 12 mm, a height of 15 mm and a thickness of 0.5 mm with laboratory equipment of optical molding comprising a three-dimensional numerically controlled table on which a container for a resin composition was placed, a helium-cadmium laser (wavelength of 325 nm) and a control unit mainly composed of an optical system and a personal computer. This cone was free from distortion to exhibit extremely high molding accuracy and was excellent in technical strengths.

In order to compare the polymerization rates with each other, the molding time of the composition was determined. The time was as short as 30 minutes.

Example 13

45 parts of 3,4-epoxycyclohexylmethyl 3,4-epoxycyclohexanecarboxylate and 25 parts of triethylene glycol divinyl ether as the radiation-curable and cationically polymerizable organic substance (a), 3 parts of bis[4-(diphenylsulfonio)phenyl] sulfide bisdihexafluoroantimonate as the radiation-sensitive initiator for cationic polymerization (b), 20 parts of dipentaerythritol hexaacrylate and 10 parts of trimethylolpropane-triacrylate as the radiation-curable and radical-polymerizable organic substance (c) and 1 part of benzil dimethyl ketal as the radiation-sensitive initiator for radical polymerization (d) were sufficiently mixed with each other to prepare a resin composition for optical molding. This composition was molded into a hanging bell-shaped article with the same laboratory equipment of laser molding as that used in Example 1. This article was free from distortion-to exhibit-extremely high molding accuracy and was excellent in mechanical strengths. Further, the composition had such a low viscosity of 130 cps (25° C.) as to be easily handlable and exhibited excellent laser curability.

Besides, in order to determine the rate of the polymerization of the composition with laser beams, the composition was molded into a conical article similar to that prepared in Example 12. The molding time was 30 minutes.

Example 14

10 parts of bisphenol A diglycidyl ether, 30 parts of 3,4-epoxycyclohexylmethyl 3,4-epoxycyclohexanecarboxylate and 20 parts of ethylene glycol divinyl ether as the radiation-curable and cationically polymerizable organic substance (a), 2 parts of triphenylsulfonium hexafluoroantimonate as the radiation-sensitive initiator for cationic polymerization (b), 15 parts of bisphenol A epoxyacrylate and 25 parts of pentaerythritol triacrylate as the radiation-curable and radical-polymerizable organic substance (c) and 2 parts of 2,2-diethoxyacetophenone as the radiation-sensitive initiator for radical polymerization (d) were sufficiently mixed with each other to give a resin composition for optical molding. This composition was molded by heating to 60° C. into a cup with the same laboratory equipment of laser molding as that used in Example 12. This cup was free from distortion to exhibit excellent molding accuracy.

Separately, in order to determine the polymerization rate, the above composition was molded into a conical article similar to that prepared in Example 12. The molding rate was high by virtue of the heating to 60° C., so that the molding time was as very short as 20 minutes.

Example 15

50 parts of 3,4-epoxycyclohexylmethyl 3,4-epoxycyclohexanecarboxylate and 30 parts of trimethylolpropane trivinyl ether as the radiation-curable and cationically polymerizable organic substance (a), 2 parts of triphenylsulfonium hexafluoroantimonate as the radiation-sensitive initiator for cationic polymerization (b), 20 parts of dipentaerythritol hexaacrylate as the radiation-curable and radical-polymerizable organic substance (c) and 2 parts of benzoin isopropyl ether as the radiation-sensitive initiator for radical polymerization (d) were sufficiently mixed with each other to give a resin composition for optical molding. This composition was molded into a hanging bell-shaped article with the same laboratory equipment of laser molding as that used in Example 12. This article was free from distortion and was excellent in mechanical strengths molding accuracy and surface smoothness.

Meanwhile, in order to determine the polymerization rate, the above composition was molded into a conical article similar to that prepared in Example 12. The molding time was 30 minutes.

What is claimed is:

1. A resin composition for optical molding consisting essentially of (a) an actinic radiation-curable and cationically polymerizable organic substance containing at least 40% by weight of an alicyclic epoxy resin having at least two epoxy groups in its molecule and at least 30% by weight of a vinyl ether resin having at least two vinyl groups in its molecule; (b) an actinic radiation-sensitive sulfonium salt initiator for cationic polymerization; (c) an actinic radiation-curable and radical-polymerizable organic substance having at least 50% by weight of a compound having at least three unsaturated double bonds in its molecule; and (d) an actinic radiation-sensitive initiator for radical polymerization, wherein the cationically polymerizable organic substance (a) and the radiation-curable and radical polymerizable organic substance (c) are respectively contained in the resin composition in amounts of 50 to 90 parts by Weight and 10 to 50 parts by weight with the sum total of both the cationically polymerizable organic substance (a) and the radiation-curable and radical polymerizable organic substance (c) being 100 parts by weight.

2. A resin composition as set forth in claim 1, wherein at least 50% by weight of the cationically polymerizable organic substance (a) is composed of an alicyclic epoxy resin.

3. A resin composition as set forth in claim 1, wherein the radiation-sensitive initiator for cationic polymerization (b) is contained in the resin composition in an amount of 0.5 to 7 parts by weight per 100 parts by weight of the cationically polymerizable organic substance (a).

4. A resin composition as set forth in claim 1, wherein the radiation-sensitive initiator for radical polymerization (d) is contained in the resin composition in an amount of 0.2 to 5 parts per 100 parts of the radiation-curable organic substance (c).

* * * * *